United States Patent
Bode et al.

(10) Patent No.: US 10,738,763 B2
(45) Date of Patent: *Aug. 11, 2020

(54) METHOD AND SYSTEM FOR CONTROLLING THE ACTIVE POWER OUTPUT OF A WIND FARM

(71) Applicant: Nordex Energy GmbH, Hamburg (DE)

(72) Inventors: Florian Bode, Northeim (DE); Detlef Drossel, Norderstedt (DE)

(73) Assignee: Nordex Energy GmbH, Hamburg (DE)

( * ) Notice: Subject to any disclaimer, the term of this patent is extended or adjusted under 35 U.S.C. 154(b) by 108 days.

This patent is subject to a terminal disclaimer.

(21) Appl. No.: 16/031,618

(22) Filed: Jul. 10, 2018

(65) Prior Publication Data
US 2019/0010926 A1    Jan. 10, 2019

(30) Foreign Application Priority Data

Jul. 10, 2017  (EP) ..................... 17180518

(51) Int. Cl.
*H02J 3/46*    (2006.01)
*H02J 13/00*   (2006.01)
(Continued)

(52) U.S. Cl.
CPC ............. *F03D 7/048* (2013.01); *F03D 7/028* (2013.01); *F03D 7/045* (2013.01); *H02J 3/386* (2013.01);
(Continued)

(58) Field of Classification Search
CPC ........ H02J 3/386; H02J 2003/007; H02J 3/16; H02J 3/46; H02J 2203/20; H02J 13/0006;
(Continued)

(56) References Cited

U.S. PATENT DOCUMENTS

| 9,217,416 B2 | 12/2015 | Spruce et al. |
| 2017/0009740 A1 | 1/2017 | Geisler et al. |
| 2018/0258914 A1* | 9/2018 | Drossel .................. F03D 7/045 |

FOREIGN PATENT DOCUMENTS

| DE | 102013012898 A1 | 2/2015 |
| DE | 102014000784 A1 | 7/2015 |

(Continued)

OTHER PUBLICATIONS

Benlahbib et al.; "Fractional Order PI Controller for Wind Farm Supervision"; Proceedings of the 2014 IEEE IEEM; on or before Dec. 31, 2014; 6 pages.

(Continued)

*Primary Examiner* — Michael J Brown
(74) *Attorney, Agent, or Firm* — Barclay Damon LLP

(57) ABSTRACT

A method for controlling an active power output in a wind farm comprises inputting a setpoint of the active power into a ramp and limiting unit to determine an internal active power setpoint. Inputting the internal active power setpoint into a distributing unit configured to calculate a modeled active power setpoint of the wind farm. Determine by a subtraction element, a control difference that is a difference between the modeled active power setpoint and an actual value of the active power output of the wind farm. Determine a controller setpoint variable and calculating an overall setpoint variable from the controller setpoint variable and the feed-forward control variable. Splitting the overall setpoint variable for models of the wind turbines and determining using the wind turbine models the modeled active power setpoint of respective wind turbines depending on a portion of the active power setpoint.

11 Claims, 1 Drawing Sheet

(51) Int. Cl.
  *F03D 7/04* (2006.01)
  *F03D 7/02* (2006.01)
  *H02J 3/38* (2006.01)
  G05B 15/02 (2006.01)
  H02J 3/16 (2006.01)
  F03D 9/25 (2016.01)

(52) U.S. Cl.
  CPC ............ *H02J 3/46* (2013.01); *F03D 9/257* (2017.02); *F05B 2270/1033* (2013.01); *F05B 2270/335* (2013.01); *H02J 13/0006* (2013.01); *H02J 2203/20* (2020.01)

(58) Field of Classification Search
  CPC .......... F03D 7/045; F03D 7/048; F03D 7/028; F03D 9/257; G05B 15/02; G05B 2219/40458; G05B 2219/2619; F05B 2270/32; F05B 2270/321; F05B 2270/404; F05B 2220/30; F05B 2240/912; F05B 2270/335; F05B 2270/1033

USPC ......................................................... 700/287
  See application file for complete search history.

(56) References Cited

FOREIGN PATENT DOCUMENTS

| | | |
|---|---|---|
| DE | 102014000790 A1 | 7/2015 |
| EP | 1946436 B1 | 6/2012 |
| EP | 2516849 B1 | 12/2016 |
| GB | 2432266 A | 5/2007 |

OTHER PUBLICATIONS

Zhao Haoran et al.; "Distributed Model Predictive Control of a Wind Farm for Optical Active Power Control—Part II: Implementation with Clustering-Based Piece-Wise Affine Wind Turbine Model"; IEEE Transactions on Sustainable Energy, vol. 6, No. 3, Jul. 2015; 10 pages.

* cited by examiner

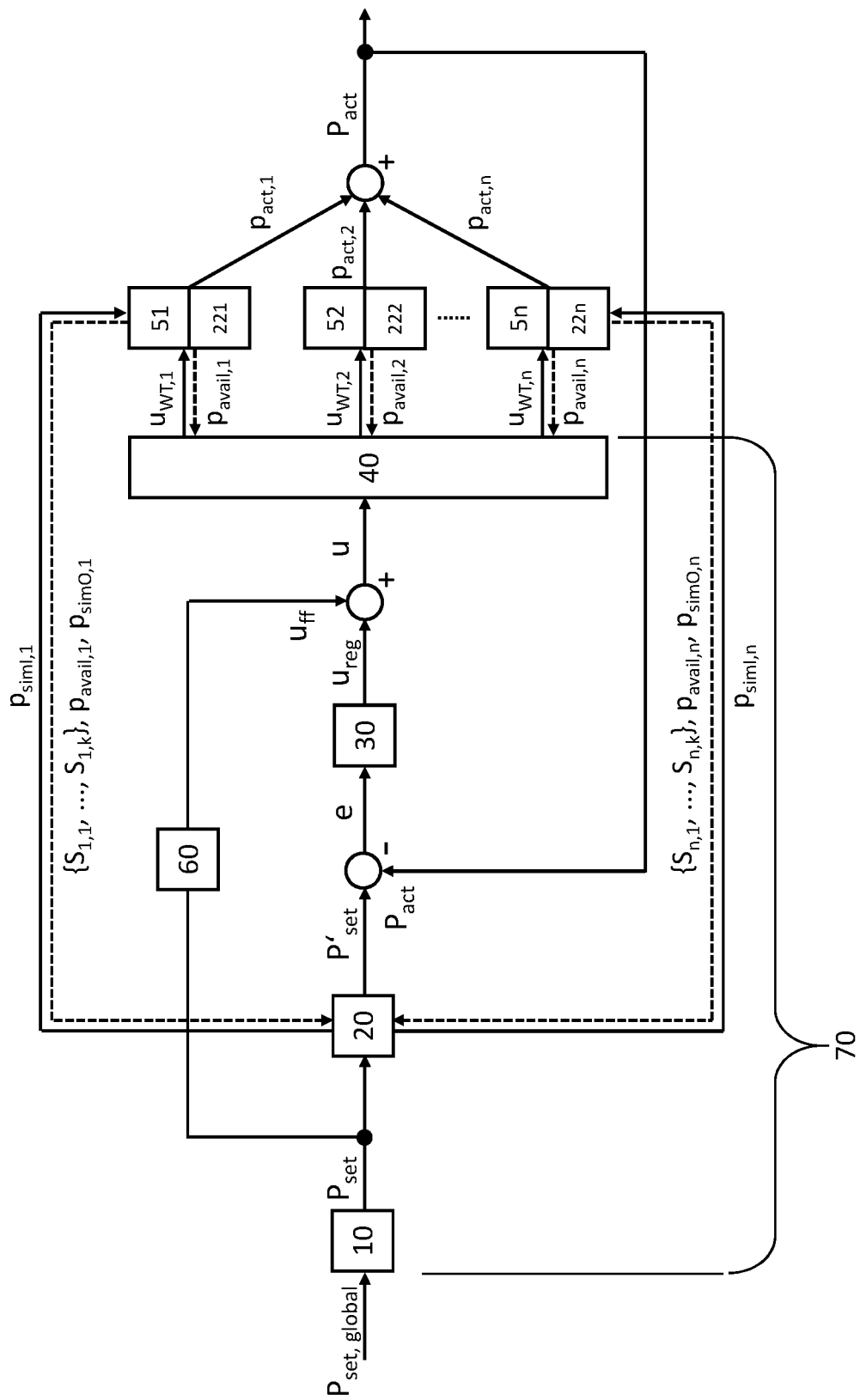

METHOD AND SYSTEM FOR CONTROLLING THE ACTIVE POWER OUTPUT OF A WIND FARM

CROSS REFERENCE TO RELATED INVENTION

This application is based upon and claims priority to, under relevant sections of 35 U.S.C. § 119, European Patent Application No. 17 180 518.7, filed Jul. 10, 2017, the entire contents of which are hereby incorporated by reference.

BACKGROUND

The present invention relates to a method and system for controlling the active power output of a wind farm, comprising a plurality of wind turbines.

With increasing use of wind turbines, whether on land or at sea, the importance thereof to the electrical power grid is increasing. Consequently with regard to infeeding active power, given setpoints for the active power fed into the grid connection point must be precisely maintained. This relates to both the stationary state in which—provided there is enough wind—a constant amount of active power is fed in, and the dynamic behavior in which a setpoint setting is varied over time and/or changeable wind conditions exist.

A wind farm control with an improved setpoint behavior has been disclosed in DE 10 2014 000 790 A1. The wind farm has a farm master with a power controller for controlling the wind turbines contained in the wind farm. A setpoint for the power output of the wind farm is applied to the farm master and is output for the wind turbines as setpoint signals for the power output. The setpoints for the wind turbines are corrected if there is a change in the setpoint signal for the wind farm, wherein the corrected setpoint is injected into the power controller. The setpoint for the wind turbine is calculated using a predictor, wherein in so doing, different operating states of the wind turbines and different power values are taken into consideration.

A wind farm with a feed-forward control in the power controller has been disclosed in DE 10 2014 000 784 A1. The wind farm has a farm master designed to manage the wind turbines, wherein the farm master comprises a power controller. The power controller has a feed-forward control module that injects a level for the target power via a multiplication element into the output of the power controller. This is to achieve accelerated response behavior of the feed-forward control when there is a setpoint reduction and create robust response behavior of the wind farm.

BRIEF SUMMARY OF THE INVENTION

The object of the present invention is to specify a method for controlling a wind farm that implements specified setpoints for the wind farm quickly and accurately using very simple means, as well as a correspondingly controlled wind farm.

The method according to the invention is provided for controlling the active power output of a wind farm having at least two wind turbines. In principle, it is also conceivable to control other electrical variables of the wind farm according to the invention. The wind farm has at least two wind turbines, the power output of which is controlled by a wind turbine controller in each case. The wind turbines can be of the same or different type of construction. In the method according to the invention, a setpoint of the active power to be output by the wind farm is applied to a distributing unit that generates a modeled active power setpoint of the wind farm. The modeled active power setpoint corresponds in aggregate to a corrected setpoint for the wind farm that the wind farm should, in sum, feed in at its grid connecting point with an energy supply grid. The modeled active power setpoint can deviate from the setpoint of the active power to be output by the wind farm applied to the distributing unit. To generate the modeled active power value of the wind farm, the distributing unit splits the applied setpoint of the active power to be output by the wind farm into active power setpoints for the simulation by the individual wind turbines. Furthermore, the simulated or modeled active power setpoints of the individual wind turbines are applied to the distributing unit in order to generate the modeled active power setpoint of the wind farm.

The active power setpoint for the wind farm is split up into the active power setpoints for the simulation by the individual wind turbines by the distributing unit based on at least one performance variable that are provided in each case by the individual wind turbines and applied to the distributing unit. The performance variables can preferably indicate the available active power of the respective turbines. In principle, as few selected operating variables as possible should be used for splitting.

The modeled active power setpoint is applied to a power controller together with the actual value of the wind farm power output by the wind farm. The power controller provides a controller setpoint variable depending on the applied input variables. A feed-forward control variable, which is determined independently of the states of the wind farm and its actual values, is added to the controller setpoint variable to form an overall setpoint variable.

According to the invention, the modeled active power setpoint of the wind farm is determined in the distributing unit from a sum of modeled active power setpoints of the individual wind turbines in the wind farm. The active power setpoint of the wind farm, or a value representative thereof, is divided into models of the wind turbines contained in the wind farm that simulate the behavior of the individual wind turbines and are run in the respective wind turbines, wherein the models are each arranged to determine a modeled setpoint of the active power of the respective wind turbine depending on the portion of the setpoint of the wind farm ascribed to the model, as well as performance variables of the respective wind turbine. The representative value can for example be a percent value that refers to an available active power, or to a rated value.

In an embodiment of the method according to the invention, the modeled active power setpoint of the wind farm is formed by many individual models that each represent the behavior of the individual wind turbines so that, for each wind turbine, the respective modeled setpoint corresponds to the setpoint determined for the respective wind turbine within the bounds of a model precision. In an embodiment, the models of the respective wind turbines contained in the wind farm are associated with the respective wind turbine controllers. The advantage of this association is that the plurality of parameters, performance variables, and state indicators that exist in the individual wind turbine controllers are also directly available for the model of the respective wind turbine. The models can preferably be run on the respective wind turbine controllers. Alternatively, an additional data processing apparatus can also be associated with the controllers that is connected to the controller via an interface, or to which the same input variables are applied as to the controller. Given the above-described architecture, a complex transmission of data from the wind turbines through the wind farm to a central control can be omitted. Since the models only supply the results of the simulation, high data traffic can be avoided. Moreover, delays and data losses can be effectively avoided, and the overall control behavior of the wind farm can therefore be optimized. Parameters, operating variables and state indicators of a turbine may comprise: Actual values, setpoints or averages of electrical variables of the turbine, rotational speed, pitch angle, azimuth angle, vibration data, external variables such as wind direction, wind speed, air density, outside temperature as well as their change over time and other instructions, information on the present operating modes such as low-noise operation, operation taking into consideration shadows, the occurrence of flying animals, or operation with reduced radar scatter, operating modes relevant to grid connection guidelines, etc., as well as state information and measurands of any subsystems of the wind turbine. In principle, the terms are to be understood as any value, or respectively any information that is also taken into consideration in the control of the wind turbine by its controller. The models are created so that they can provide simulation results almost in real time. The input variables are therefore applied to the models with the same time resolution and without a time delay. The active power behavior can for example be simulated so that the models calculate and provide output values for the modeled active power in a clock cycle of approximately 1000 ms.

In an embodiment, the association of the model of the wind turbine and the wind turbine controller is such that the model can directly access the parameters, operating variables and state indicators, or forms the latter itself from the applied variables without data having to be transmitted in or through the wind farm. The parameters, operating variables and state indicators can be any type of data that are provided in the wind turbine controller for managing and controlling the wind turbine.

In a preferred embodiment, the overall setpoint variable is split into turbine setpoint variables of the wind turbines in the wind farm in the method according to the invention. The overall setpoint variable determined by the additive feed-forward control is split into turbine setpoint variables in the method according to the invention. The turbine setpoint variables calculated from the splitting are applied as setpoints for the active power to be provided by the respective wind turbine to the controllers of the individual wind turbines. An active power setpoint or a percent value that refers to the rated power of the respective wind turbine, or to its currently available active power, can for example be used as the turbine setpoint variable.

The overall setpoint variable is split up into the turbine setpoint variables by a setpoint distribution unit to which the overall setpoint variable is applied. In addition, for each of the wind turbines, at least one operating variable that can be used for splitting the overall setpoint variable, such as its available active power, is applied to the setpoint distribution unit. In one particularly preferred embodiment of the method according to the invention, the overall setpoint variable is split up using values for the available active power of the individual wind turbines.

In and embodiment of the method according to the invention, the values specified for the overall wind farm are split up into turbine-specific values at two locations. Splitting is carried out in the distributing unit in the formation of the active power setpoints for the individual models of the wind turbines. The active power setpoints of the wind turbines modeled by the corresponding models are modeled with reference to operating variables, parameters and state indicators of the wind turbine controller. Depending on the applied split-up active power setpoints, the models of the wind turbines calculate in each case the modeled active power setpoint that is transmitted to the distributing unit and that is then added up into a modeled active power setpoint of the wind farm together with the other modeled active power setpoints. The totality of the models of the wind turbines represents the behavior of the wind farm. Another splitting is carried out by the setpoint distribution unit when setpoint variables are provided for the individual controllers of the wind turbines of the wind farm. The split-up setpoint variables are determined from the overall setpoint variable. The overall setpoint variable can be split up into the turbine setpoint variables, for example by using available active power values that are specified by the individual wind turbines, or respectively their controllers. Likewise, the active power setpoint of the wind farm can be split up for modeling by models of the individual wind turbines by using the available active power specified by the individual wind turbines. In a preferred embodiment, the turbine setpoint variables are determined by the setpoint distribution unit by using the same variables on the basis of which the setpoints are calculated by the distributing unit for the simulation by the individual turbines. In an embodiment, splitting is carried out in both cases by using the available active powers of the individual wind turbines.

In another embodiment, at least one operating variable, parameter and/or state indicator of the wind turbine is applied to the respective models of the wind turbines in order to minimize a deviation between the actual value of the active power of the wind turbine and the modeled power value. Instead of or in addition to the available active power, at least one additional operating variable, an additional parameter, or state indicator of the wind turbines is also preferably applied to the distributing unit in order to take it into consideration when splitting up the setpoint for the wind farm into the setpoints for the simulation by the individual models of the wind turbines. Preferably, the additional operating variable, additional parameter, or respectively state indicator is information on an operating mode active in the respective wind turbines. To reduce the information, operating modes can be defined in the distributing unit. Examples of such a mode are reduced-noise operation, reduced-power operation due to a defective component, or reduced-power operation due to an operating temperature. In principle, such modes can describe any state relating to a specific wind turbine. Alternatively or in addition, a few selected operating variables, parameters and/or state indicators, such as information on a current rotational speed, can be provided by the individual wind turbines as additional variables. For complex modeling methods, the wind farm network does not have to be designed for large data volumes since the modeling is completely local in the wind turbines. The transmission of one or a few additional operating variables, parameters and/or state indicators would only slightly increase the data traffic in the wind farm network and can help optimize the initial splitting. The processing of operating variables, parameters and/or state indicators by the models does not mean that variables of the wind farm are controlled on the level of the individual wind turbines. Rather, these variables of the wind turbines serve so that the current behavior of the wind turbines that is strongly subjected to local and individual influences can be taken into consideration in the modeling, and deviations from a wrong chosen model approach can be avoided. By accessing these variables, errors in model formation are minimized, and the dynamic behavior of the individual wind turbines is represented more accurately. The modeled active power setpoint of an individual wind turbine is dependent on the current operating variables/operating modes, just like the active power that is actually fed in by the wind turbine.

In an embodiment, the wind farm has at least two wind turbines, furthermore a wind farm controller to which is applied an externally specified active power setpoint for the active power to be fed in by the wind farm at its grid connecting point. The wind farm controller has a feed-forward control unit that calculates a feed-forward control variable independently of the operating states of the wind farm and their actual values. Furthermore, the wind farm controller has a distributing unit that is provided and configured to generate a modeled active power setpoint of the wind farm from the setpoint of the active power to be output by the wind farm. To this end, the distributing unit is configured to calculate active power setpoints as input variables for modeling by models of the individual wind turbines, and to provide the active power setpoints to them. The distributing unit is moreover configured to receive the modeled active power setpoints as output variables from the individual models, to add them up into a modeled active power value of the wind farm, and to provide them to a differential element. The differential element is configured to calculate a control difference from the modeled active power setpoint of the wind farm and an actual value of the active power output of the wind farm. Furthermore, a power controller is configured to calculate a controller setpoint variable from the control difference. Another summation element that is provided is configured to calculate an overall setpoint variable for the wind farm from the feed-forward control variable and the controller setpoint variable, and to provide it to a setpoint distribution unit. The setpoint distribution unit is provided and configured to calculate active power setpoints for the individual wind turbines of the wind farm depending on the applied overall setpoint variable for the wind farm, and to provide them to the respective wind turbines.

Alternative to the active power setpoints for the individual wind turbines, turbine setpoint variables that are characteristic of the active power, such as a percent value that refers to the rated power of the respective wind turbine or its currently available active power, can be provided for controllers of the wind turbines. The individual wind turbines of the wind farm each have one of the controllers that is provided and configured to control the respective wind turbine. The controllers are in particular configured to control the active power output from the respective wind turbine depending on the active power setpoint provided by the setpoint distribution unit or the turbine setpoint variable. Furthermore, the wind turbines each have a model that is configured to simulate the behavior of the respective wind turbine depending on applied input variables. A portion of the active power setpoint or the value representative thereof for the wind farm is applied to the respective turbine models as an input variable. Depending on the specified portion, the models of the individual wind turbines are configured to calculate as an output variable, a modeled active power setpoint, or the value representative thereof, of the active power to be generated by the respective wind turbine, and to provide it to the distributing unit.

In conjunction with the present invention, the externally specified active power setpoint is also understood to be setpoints that are calculated inside the wind farm. For example, the wind farm controller can calculate the setpoint based on external specifications that are taken into consideration in the controller. Accordingly for example, a characteristic of the active power setpoint can be specified depending on the grid frequency, on the basis of which the wind farm controller determines the active power setpoint depending on external specifications depending on an applied frequency measured at the grid connecting point of the wind farm. The externally specified active power setpoint can however also be provided directly by the operator of the power supply grid.

In an embodiment of the wind farm according to the invention, the models of the wind turbines are associated with the wind turbine controllers so that operating variables, parameters and/or state indicators from the wind turbine controllers do not have to be transmitted through the wind farm instead, the model of the wind turbine can preferably access them directly. In a preferred embodiment, the turbine models are configured to model the behavior of the respective individual wind turbines depending on the applied variables. The models can preferably be run on the respective wind turbine controllers. Alternatively, an additional data processing apparatus can also be associated with the controllers that is connected to the controller via an interface, or to which the same input variables are applied as to the controller. For example, the controller can be designed redundantly so that the second controller only performs the simulation in a normal state and, in the event that the first controller fails, can be used as a backup therefor so that a failure of the wind turbine can also be avoided.

The active power to be generated by the wind farm is split up, as the active power setpoint for the simulation by a distributing unit, for the models of the individual wind turbines, wherein based on the corresponding turbine model, the models are configured to calculate a modeled active power setpoint for the active power to be generated by the modeled turbines depending on the applied, split-up active power setpoints, as well as depending on at least one applied operating variable of the modeled wind turbine. The distributing unit is configured to split up the specified active power setpoint of the wind farm for the models of the wind turbines contained in the wind farm. The splitting up can for example be carried out by using available active power values that are specified by the individual wind turbines, or respectively their controllers, and are applied as input variables to the distributing unit. Alternatively or in addition, a few selected operating variables, parameters and/or state indicators, such as information on a current rotational speed, can be provided by the individual wind turbines as additional variables. For complex modeling methods, the wind farm network does not have to be designed for large data volumes since the modeling is completely local in the wind turbines. The transmission of one or a few additional operating variables, parameters and/or state indicators would only slightly increase the data traffic in the wind farm network and can help optimize the initial splitting.

The setpoint distribution unit of the wind farm controller is configured to split up the overall setpoint variable for the active power to be output by the wind farm into setpoints provided for the individual wind turbines, and to provide a corresponding active power setpoint for the individual wind turbines, or respectively their controllers. The splitting up, be it of the overall setpoint variable or the active power setpoint, is preferably carried out by using the active power reported as available by the individual wind turbines, i.e., depending on the operating state of the individual turbines. Depending on the feed-forward control and the employed models, the following can be achieved: the modeled setpoints for the individual turbines and the setpoints provided by the setpoint distribution unit for the individual turbines will only slightly deviate from each other, even given strong changes in input of the setpoint applied to the wind farm controller.

The aforementioned units of the wind farm communicate data in a known manner, for example are connected to each other by a wind farm network. Any number of known protocols can be used for communication within the wind farm network. Individual elements of the aforementioned controller can be combined structurally into an assembly, or respectively be designed as a software module in an assembly. For example, the distributing unit, addition and subtraction elements, power controller, setpoint distribution unit, and feed-forward control unit can be combined in a wind farm controller.

A particular advantage of the wind farm according to the invention is that the control of the active power to be fed in by the wind farm is broken down to the generating wind turbines by the models that take into consideration the operating states of the individual wind turbines almost in real time. Accordingly, improved control dynamics can be achieved without having to expand the data transmission capacity of the wind farm network. By taking into consideration individual variables of the wind turbines when splitting up for modeling and feed-forward control, the modeled active power setpoint of the wind farm approximates the actual value of the active power fed in at the grid connecting point of the wind farm, and the control difference at the subtraction element converges toward zero. The model thereby compensates, or respectively reduces insufficient dynamics of the power controller. Additional costs are avoided by implementing the models in the existing controllers of the wind turbines.

An exemplary embodiment of the invention is explained in greater detail below. FIG. 1 is the only FIGURE and illustrates a block diagram of a wind farm with a feed-forward control and a splitting up of the setpoint variables for the individual wind turbines.

BRIEF DESCRIPTION OF THE DRAWINGS

FIG. 1 is a schematic showing how an externally specified active power setpoint of the wind farm $P_{set,global}$ is applied to a limiting and ramp unit of a wind farm controller.

DETAILED DESCRIPTION OF THE INVENTION

FIG. 1 shows how an externally specified active power setpoint of the wind farm $P_{set,global}$ is applied to a limiting and ramp unit 10 of a wind farm controller 70. The active power setpoint of the wind farm $P_{set,global}$ is an externally specified setpoint for the active power to be output by the wind farm. In the exemplary embodiment, this externally specified setpoint is specified for the wind turbine by a logically higher-level unit of the grid operator. This specified setpoint should be maintained as much and as precisely as possible under given wind conditions. In the ramp and limiting unit 10, the active power setpoint specified externally $P_{set,global}$ is limited for the wind farm to the setpoints and setpoint jumps that are possible for the wind farm. Likewise, changes in the specified active power setpoint are smoothed by ramps. In technical terms, the externally specified active power setpoint $P_{set,global}$ can be considered a reference variable that is implemented by the ramp and limiting unit 10 in a wind-farm internal active power setpoint $P_{set}$. The externally specified active power setpoint $P_{set,global}$ that is smoothed in this manner for the internal active power setpoint $P_{set}$ is applied to a distributing unit 20 of the wind farm controller 70. The distributing unit 20 generates a modeled active power setpoint $P'_{set}$ for the wind farm. The modeled active power setpoint $P'_{set}$ indicates the response of the wind farm to the internal active power setpoint $P_{set}$ based on a modeling of the individual wind turbines. The modeled active power setpoint $P'_{set}$ can be considered an anticipated actual value that indicates which actual value is generated as a response to the modeled active power setpoint $P'_{set}$. From the modeled active power setpoint $P'_{set}$ and the measured actual value of the active power $P_{act}$ fed in at the grid connecting point of the wind farm, a control difference e is formed by a subtraction element of the wind farm controller 70. The control difference e is the difference between the modeled active power setpoint $P'_{set}$ and the actual value of the output active power $P_{act}$. A controller setpoint variable $u_{reg}$ is calculated from the setpoint variable e by a power controller 30 of the wind farm controller 70. The power controller 30 is parameterized for this with a corresponding characteristic. If the results of the models correspond with the real behavior of the wind farm, and if the power controller 30 is accordingly in its steady state, the control variable e will basically disappear (be equal to zero), and the controller setpoint variable $u_{reg}$ will therefore as well.

The overall setpoint variable u is formed by a summation element of the wind farm controller 70 that forms the sum of the feed-forward control variable $u_{ff}$ that is calculated by a feed-forward control unit 60 of the wind farm controller 70, and the controller setpoint variable $u_{reg}$. The injection by the feed-forward control unit 60 is additive. In the context of the feed-forward control unit 60, it is possible to dimension the power controller 30 with its time constants and its response behavior corresponding to the disturbance variables that normally occur in a wind farm. The overall setpoint variable u for the wind farm is split up in a setpoint distribution unit 40 of the wind farm controller 70 into the individual setpoint variables $u_{wea,1}, u_{wea,2}, \ldots, u_{wea,n}$ that form the setpoint variables for the individual wind turbines in the wind farm.

Each wind turbine in the wind farm possesses a controller. 51, 52, ..., 5n. The controllers of the wind turbines 51, 52, ..., 5n are schematically portrayed in FIG. 1. When the setpoint distribution unit 40 splits up the setpoint variables $u_{wea,1}, u_{wea,2}, \ldots, u_{wea,n}$, the setpoint variables $u_{wea,1}, u_{wea,2}, \ldots, u_{wea,n}$ are split up for the individual wind turbines such that, totaled, they correspond to the overall setpoint variable u, and in response to the setpoint variables, the wind turbines provide active powers $p_{act,i}$ that, totaled, correspond to the actual value of the active power $P_{act}$ at the grid connecting point of the wind farm. Each wind turbine supplies a contribution to the active power $P_{act}$ to be output by the wind farm. In splitting up the overall setpoint variable u, it can for example be taken into consideration that the wind turbines combined into the wind farm can possess different operating states. Power reserves, servicing tasks and other turbine-specific variables and specifications can also be taken into consideration here. In order to be able to track the externally specified active power setpoint $P_{set,global}$ as quickly as possible, different control times of the individual wind turbines, for example, can also be taken into consideration when splitting up. A fast control can, for example, be ensured when the setpoint u is split up for the individual turbines by using the power $P_{avail,1}, P_{avail,2}, \ldots, P_{avail,n}$ which is reported as being available.

The distributing unit 20 splits up the setpoint $P_{set}$ for the wind farm into setpoints, or respectively input values for the simulation by the models of the individual wind turbines $P_{simI,1}, P_{simI,2}, \ldots, P_{simI,n}$. The split up setpoints are applied to the respective model of the wind turbine 221, 222, ... 22n. Output variables of the models for the wind turbines 221, 222, ... 22n are the modeled active power setpoints of the wind turbines $P_{simO,1}, P_{simO,2}, \ldots, P_{simO,n}$. These variables are transmitted to the distributing unit 20 and are added up therewith into the modeled active power value $P'_{set}$.

The models of the wind turbines 221, 222, ..., 22n each correspond to models of the individual wind turbines that are run in the wind turbines, preferably by their controllers 51, 52, ..., 5n.

An important aspect in the portrayed exemplary embodiment is that the modeled active powers of the individual wind turbines $P_{simO,i}$ approximately correspond to the active power actual values of the wind turbine $P_{act,i}$. This means that the splitting up of the setpoint $P_{set}$ for the simulation is complementary to the splitting up of the setpoint variable u for the individual wind turbines.

A particular advantage becomes apparent for the data link between the distributing unit 20 and the models of the wind turbines 221, 222 ... 22n. If any model 22i of the i-th wind turbine is considered, $P_{simI,i}$ is transmitted by the distributing unit to the model 22i. All of the necessary information is applied by the wind turbine controller 5i to the model for modeling the setpoint $P_{simO,i}$. One or a few selected operating variables $S_{i,1}, S_{i,2}, \ldots S_{i,k}$ are transmitted by the wind turbine controller 5i and/or the wind turbine model 22i to the dividing unit 20 where they can be taken into consideration when splitting the setpoints. Likewise, the active power $P_{avail,i}$ available at the i-th wind turbine can also be transmitted in order to take into consideration the variable when splitting up the setpoints for the turbines.

REFERENCE LIST

10 Limiting and ramp unit
20 Distributing unit
221 Model of the first wind turbine
222 Model of the second wind turbine
22n Model of the n-th wind turbine
30 Power controller
40 Setpoint distribution unit
51 Controller of the first wind turbine
52 Controller of the second wind turbine
5n Controller of the n-th wind turbine
60 Feed-forward control unit
70 Wind farm controller
$P_{set,global}$ Externally specified active power setpoint of the wind farm
$P_{set}$ Internal active power setpoint of the wind farm
$P_{simI,1}$ Active power setpoint split up for the first wind turbine for modeling
$P_{simI,2}$ Active power setpoint split up for the second wind turbine for modeling
$P_{simI,n}$ Active power setpoint split up for the n-th wind turbine for modeling
$P_{simO,1}$ Modeled active power setpoint of the first wind turbine
$P_{simO,2}$ Modeled active power setpoint of the second wind turbine
$P_{simO,n}$ Modeled active power setpoint of the n-th wind turbine
$P'_{set}$ Modeled active power setpoint of the wind farm
$P_{act}$ Actual value of the active power fed in at the grid connecting point of the wind farm
e Control difference between the modeled active power setpoint and the actual value of the output active power of the wind farm
$u_{reg}$ Controller setpoint variable
$u_{ff}$ Feed-forward control variable
u Overall setpoint variable as a sum of the feed-forward control variable and the controller setpoint variable
$u_{WT,1}$ Split up setpoint variable for the first wind turbine
$u_{WT,2}$ Split up setpoint variable for the second wind turbine
$u_{WT,n}$ Split up setpoint variable for the n-th wind turbine
$P_{avail,1}$ Available active power of the first wind turbine
$P_{avail,2}$ Available active power of the second wind turbine
$P_{avail,n}$ Available active power of the n-th wind turbine
$P_{act,1}$ Active power actual value of the first wind turbine
$P_{act,1}$ Active power actual value of the second wind turbine
$P_{act,n}$ Active power actual value of the n-th wind turbine
$\{S_{1,1}, \ldots, S_{1,k}\}$ Amount of k-operating variables of the first wind turbine
$\{S_{n,1}, \ldots, S_{n,k}\}$ Amount of k-operating variables of the n-th wind turbine

The invention claimed is:

1. A method for controlling an active power output ($P_{act}$) in a wind farm with at least two wind turbines whose power output is each controlled by a wind turbine controller, the method comprising;
    inputting a setpoint of an active power ($P_{set}$, $P_{set,global}$) into a ramp and limiting unit to determine an internal active power setpoint ($P_{set}$);
    inputting the internal active power setpoint ($P_{set}$) into a distributing unit, wherein the distributing unit is configured to,
        split the internal active power setpoint ($P_{set}$) into active power setpoints for simulation by individual wind turbines ($P_{simI,1}$, $P_{simI,2}$, $P_{simI,n}$),
        receive modeled active power setpoints of individual wind turbines ($P_{simO,1}$, $P_{simO,2}$, $P_{simO,n}$), and
        calculate a modeled active power setpoint of the wind farm ($P'_{set}$) from the received active power setpoints of the wind turbines ($P_{simO,1}$, $P_{simO,2}$, $P_{simO,n}$);
    determining by a subtraction element, a control difference (e) that is a difference between the modeled active power setpoint ($P'_{set}$) and an actual value of the active power output ($P_{act}$) of the wind farm;
    inputting the control difference into a power controller and determining a controller setpoint variable ($u_{reg}$);
    inputting the internal active power setpoint ($P_{set}$) into a feed-forward control unit to determine a feed-forward control variable ($u_{ff}$);
    calculating an overall setpoint variable (u) by summing the controller setpoint variable ($u_{reg}$) and the feed-forward control variable ($u_{ff}$);
    splitting the overall setpoint variable (u) for models of the at least two wind turbines contained in the wind farm; and
    determining using the models for the at least two wind turbines, the modeled active power setpoint of respective wind turbines ($P_{simO,1}$, $P_{simO,2}$, $P_{simO,n}$) depending on a portion of the active power setpoint ($P_{simI,1}$, $P_{simI,2}$, $P_{simI,n}$) split up for a respective wind turbine model,
    wherein the models of the at least two wind turbines are run on respective wind turbine controllers.

2. The method according to claim 1, wherein the models of the at least two wind turbines process at least one of an operating variable, a parameter, and a state indicator of the respective wind turbine.

3. The method according to claim 1, wherein behavior of the wind farm is represented by a totality of the models of the at least two wind turbines.

4. The method according to claim 1, wherein the overall setpoint variable (u) is split into setpoint variables ($u_{WT,1}$, $u_{WT,2}$, $u_{WT,n}$) for the individual wind turbines.

5. The method according to claim 4, wherein the overall setpoint variable (u) is split up for the individual wind turbines depending on available active power ($P_{avail,1}$, $P_{avail,2}$, ...).

6. The method according to claim 1, wherein the distributing unit splits up the internal active power setpoint ($P_{set}$) depending on at least one of an operating variable, a parameter, and a state indicator of the wind turbine.

7. A wind farm control system comprising:
at least two wind turbines; and
a wind farm controller, wherein a setpoint is applied for the active power ($P_{set}$, $P_{set,global}$) to be output by the wind farm for controlling the at least two wind turbines, the wind farm controller comprising,
   a ramp and limiting unit to determine an internal active power setpoint ($P_{set}$) from the active power ($P_{set}$, $P_{set,global}$),
   a distributing unit configured to,
      split internal active power setpoint ($P_{set}$) into active power setpoints for individual wind turbines ($P_{simI,1}$, $P_{simI,2}$, $P_{simI,n}$),
      receive modeled active power setpoints of individual wind turbines ($P_{simO,1}$, $P_{simO,2}$, $P_{simO,n}$), and
      determine a modeled active power setpoint ($P'_{set}$) of the wind farm by summing received active power setpoints of the individual wind turbines ($P_{simO,1}$, $P_{simO,2}$, $P_{simO,n}$),
   a subtraction element configured to calculate a control difference (e) from the modeled active power setpoint ($P'_{set}$) of the wind farm and an active power output ($P_{act}$) of the wind farm,
   a power controller configured to determine a controller setpoint variable ($u_{reg}$) from the control difference (e),
   a feed-forward control unit configured to calculate a feed-forward control variable ($u_{ff}$) independently of operating states of the at least two wind turbines, and
   a summation element configured to calculate an overall setpoint variable (u) for the wind farm from the feed-forward control variable ($u_{ff}$) and the controller setpoint variable ($u_{reg}$),
wherein the at least two wind turbines each have a wind turbine controller configured to run a model of the wind turbine to which the active power setpoint for the wind turbine ($P_{simI}$) is applied, and wherein a modeled active power setpoint for the wind turbine ($P_{simO}$) is determined and input back into the distributing unit.

8. The wind farm control system according to claim 7, wherein each of the models of the wind turbines is configured to process at least one of an operating variable, a parameter, and a state indicator of a respective wind turbine.

9. The wind farm control system according to claim 7, further comprising a setpoint distribution unit that is configured to split up the overall setpoint variable (u) into setpoint variables ($u_{WT,1}$, $u_{WT,2}$, $u_{WT,n}$) for individual wind turbines.

10. The wind farm control system according to claim 9, wherein the setpoint distribution unit is configured to split up the overall setpoint variable (u) for the individual wind turbines ($u_{WT,1}$, $u_{WT,2}$,) depending on available active power ($P_{avail,1}$, $P_{avail,2}$, ).

11. The wind farm according to claim 9, wherein the distributing unit is configured to split up the overall setpoint variable (u) depending on at least one of an operating variable, a parameter, and a state indicator of the wind turbine.

* * * * *